United States Patent
Becker et al.

(10) Patent No.: US 11,480,149 B2
(45) Date of Patent: Oct. 25, 2022

(54) WIND TURBINE, ROTOR SYSTEM, AND METHOD FOR USING A WIND TURBINE

(71) Applicants: thyssenkrupp rothe erde Germany GmbH, Dortmund (DE); thyssenkrupp AG, Essen (DE)

(72) Inventors: Daniel Becker, Habichtswald-Ehlen (DE); Thomas Handreck, Anröchte (DE); Bernd Lüneburg, Mülheim (DE)

(73) Assignees: THYSSENKRUPP ROTHE ERDE GERMANY GMBH, Dortmund (DE); THYSSENKRUPP AG, Essen (DE)

( * ) Notice: Subject to any disclaimer, the term of this patent is extended or adjusted under 35 U.S.C. 154(b) by 107 days.

(21) Appl. No.: 16/770,127

(22) PCT Filed: Dec. 19, 2018

(86) PCT No.: PCT/EP2018/085999
§ 371 (c)(1),
(2) Date: Jun. 5, 2020

(87) PCT Pub. No.: WO2019/122023
PCT Pub. Date: Jun. 27, 2019

(65) Prior Publication Data
US 2021/0172417 A1  Jun. 10, 2021

(30) Foreign Application Priority Data

Dec. 21, 2017 (DE) .................... 10 2017 223 615.9
Jul. 10, 2018 (DE) .................... 10 2018 211 430.7

(51) Int. Cl.
*F03D 1/06* (2006.01)
*F03D 80/70* (2016.01)

(52) U.S. Cl.
CPC .......... *F03D 1/0658* (2013.01); *F03D 80/70* (2016.05); *F05B 2250/232* (2013.01); *F05B 2260/79* (2013.01)

(58) Field of Classification Search
None
See application file for complete search history.

(56) References Cited

U.S. PATENT DOCUMENTS 8,449,263 B2 * 5/2013 Leland .................. F03D 1/0691
                                                    416/244 A
9,074,581 B2 * 7/2015 Bagepalli .............. F03D 1/0658
(Continued)

FOREIGN PATENT DOCUMENTS

AU    2016 333 250 A    9/2017
CN      101194103 A     6/2008
(Continued)

OTHER PUBLICATIONS

English Translation of International Search Report issued in PCT/EP2018/085999, dated Mar. 14, 2019.

*Primary Examiner* — Courtney D Heinle
*Assistant Examiner* — Jason Fountain
(74) *Attorney, Agent, or Firm* — thyssenkrupp North America, LLC

(57) ABSTRACT

A wind turbine may include a rotor hub, a blade bearing, a rotor blade, and a conical rotor-hub extension disposed between the rotor hub and the blade bearing. The conical rotor-hub extension may have a first diameter on a first side that is directed toward the blade bearing and a second diameter on a second side that is directed toward the rotor hub. The first diameter may be greater than the second diameter, and the rotor blade may be connected to the blade bearing directly or indirectly. The blade bearing may comprise a first blade-bearing ring and a second blade-bearing ring, with the first blade-bearing ring being connected to the (Continued)

conical rotor-hub extension in a form-fitting manner, in a form- and force-fitting manner, or in a form configured as part of the conical rotor-hub extension.

16 Claims, 14 Drawing Sheets

(56) References Cited

U.S. PATENT DOCUMENTS

| | | | |
|---|---|---|---|
| 9,181,982 B2* | 11/2015 | Lindholst | F16C 33/64 |
| 9,239,040 B2* | 1/2016 | Leonard | F03D 1/0658 |
| 9,328,716 B2* | 5/2016 | Alti Barbon | F03D 80/50 |
| 10,823,155 B2* | 11/2020 | Wu | F03D 1/06 |
| 2003/0116970 A1 | 6/2003 | Weitkamp | |
| 2007/0231137 A1 | 10/2007 | Nitzpon | |
| 2009/0175724 A1 | 7/2009 | Russ et al. | |
| 2012/0134840 A1* | 5/2012 | Leland | F03D 1/0691 416/244 R |
| 2013/0216394 A1* | 8/2013 | Leonard | F03D 1/0658 416/248 |
| 2013/0330199 A1* | 12/2013 | Bagepalli | F03D 1/0658 416/223 R |
| 2014/0010660 A1 | 1/2014 | Handreck | |
| 2014/0084592 A1 | 3/2014 | Pescarmona | |
| 2014/0355922 A1* | 12/2014 | Lindholst | F03D 1/0658 384/512 |
| 2014/0361547 A1* | 12/2014 | Alti Barbon | F03D 9/25 290/55 |
| 2018/0266399 A1* | 9/2018 | Wu | F03D 1/0691 |

FOREIGN PATENT DOCUMENTS

| | | |
|---|---|---|
| DE | 101 40 793 A | 3/2003 |
| DE | 20 2005 007 450 U | 7/2005 |
| DE | 10 2004 046 260 A | 4/2006 |
| DE | 10 2013 101 233 A | 8/2013 |

* cited by examiner

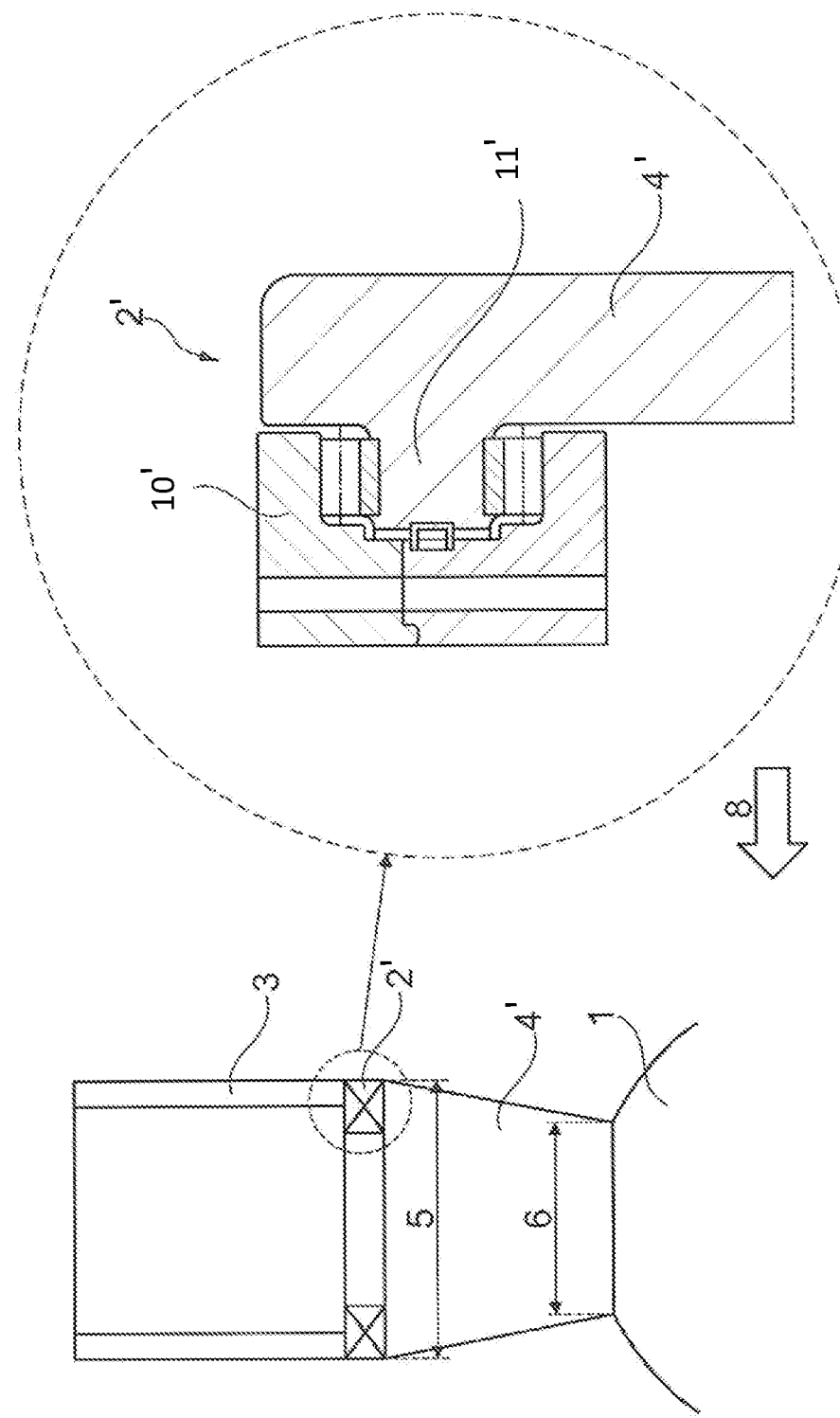

WIND TURBINE, ROTOR SYSTEM, AND METHOD FOR USING A WIND TURBINE

CROSS REFERENCE TO RELATED APPLICATIONS

This application is a U.S. National Stage Entry of International Patent Application Serial Number PCT/EP2018/085999, filed Dec. 19, 2018, which claims priority to German Patent Application No. DE 10 2018 211 430.7, filed Jul. 10, 2018, and German Patent Application No. DE 10 2017 223 615.9, filed Dec. 21, 2017, the entire contents of all of which are incorporated herein by reference.

FIELD

The present disclosure generally relates to wind turbines, as well as to rotor hubs, blade bearings, rotor blades, and rotor systems.

BACKGROUND

Current development trends in the multi-megawatt range of wind turbines are moving toward hubs becoming steadily larger (scaling), wherein the blade bearing, usually in the form of a separate, i.e. independent, component, has to be scaled along therewith. However, in line with the current trend, the overall size of the hub will come up against practical limits set by logistical and technical boundary conditions. However, it is desirable for the blade length and therefore, for mechanical reasons, the blade-flange diameter and the diameter of the blade bearing (and also the tower height) to increase further for the purpose of optimizing the energy output of the wind turbines to a greater extent. Arrangements which are known from the prior art cannot satisfactorily solve the resulting problems.

Thus a need exists for a wind turbine that allows for advantageous upscaling of the size of wind turbines.

In some examples, a wind turbine may comprise a rotor hub, a blade bearing, and a rotor blade. A conical rotor-hub extension may be arranged between the rotor hub and the blade bearing. The rotor-hub extension has a first diameter on its side which is directed toward the blade bearing and a second diameter on its side which is directed toward the rotor hub. The first diameter is greater than the second diameter, and the rotor blade is connected to the blade bearing directly or indirectly.

BRIEF DESCRIPTION OF THE FIGURES

FIG. 14 is a schematic view of a sub-region of another example wind turbine.

DETAILED DESCRIPTION

Figure 1:
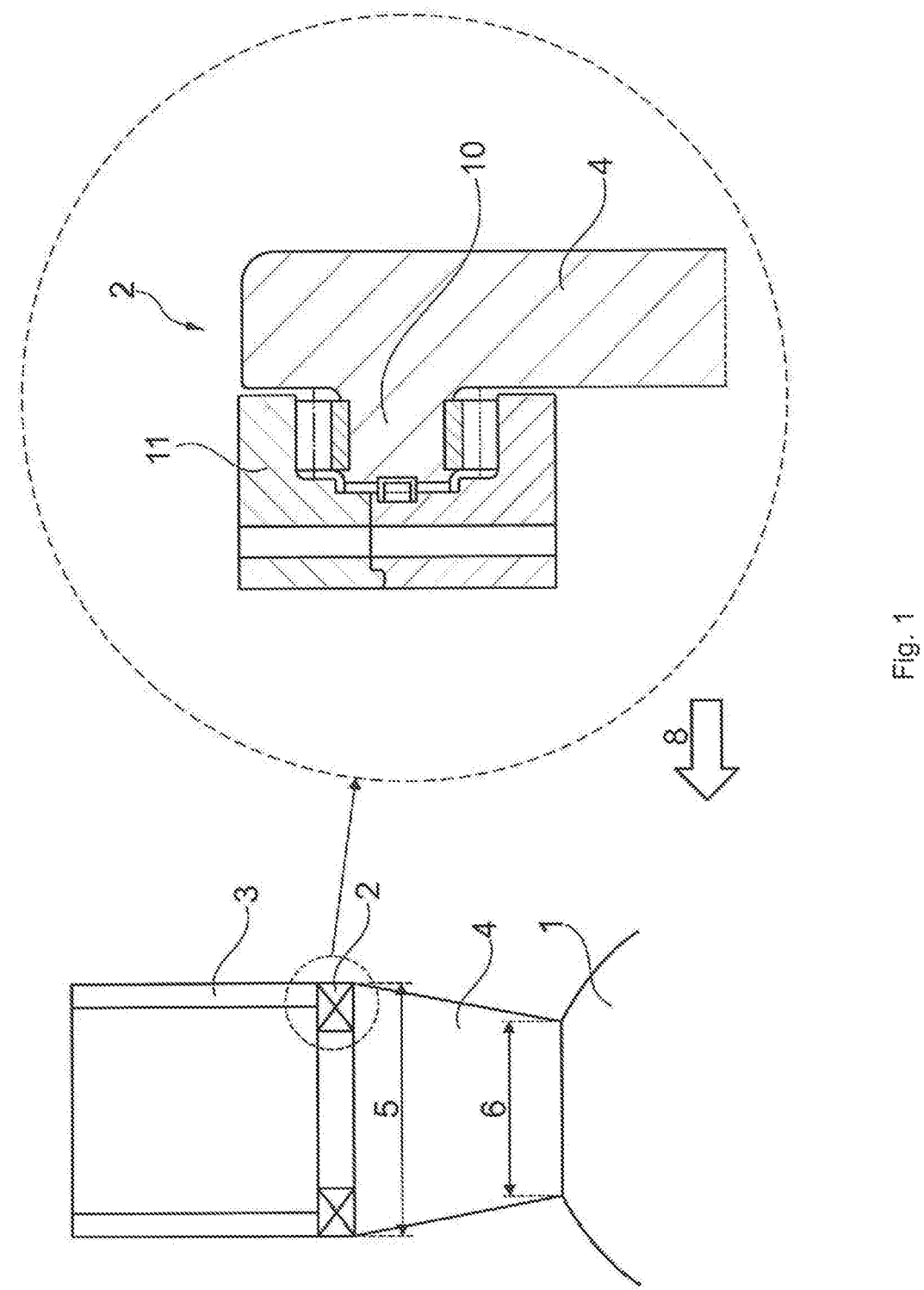
FIG. 1 is a schematic view of a sub-region of a wind turbine according to one example.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

It is thus advantageously possible according to the invention for that diameter of a conical rotor-hub extension which is directed toward the blade bearing to be greater than that diameter of the conical rotor-hub extension which is directed toward the rotor hub, that is to say for the rotor-hub extension to taper in the direction of the rotor hub. This allows for the rotor blade (and therefore the blade bearing) to be increased in size without the connection of the rotor-hub extension to the rotor hub (and therefore in particular the rotor hub itself) likewise being increased in size. This advantageously makes it possible to realize a wind turbine in the case of which the rotor-hub-flange diameter is smaller than the rotor-blade-flange diameter. It is therefore possible according to the invention to use an advantageously comparatively small and if appropriate lightweight rotor hub, which can have advantageous effects on the costs, transport options and the weight. At the same time, there is an increased level of variability in the combination of components, since the rotor-blade-flange diameter and the rotor-hub-flange diameter need not be identical. The conical shape of the rotor-hub extension means that in particular uncomplicated and cost-effective manufacturing is possible. It is also possible according to the invention for the rotor blade to be connected, for example screwed, to the blade bearing directly or indirectly, as a result of which the blade bearing can be easily removed. Furthermore, the invention gives rise to the advantage that the rigidity of the hub-side connection structure can be improved by the rotor-hub extension, as a result of which the rotor hub can be optimized in terms of weight and/or size. As a result, despite increased loading due to further scaling of the components, it is possible to dispense with additional reinforcements in the blade bearing or such additional reinforcements can at least be reduced.

Provision is made in particular for the rotor-hub extension to be hollow.

According to one embodiment of the present invention, provision is made for the rotor blade to be connected to the blade bearing directly, that is to say in particular without any adapter or intermediate piece. It is preferably possible here for the blade bearing and the rotor blade to be connected in a form-fitting manner or form-fitting and force-fitting manner with the aid of a fastening means (for example with the aid of screws). This can have in particular an advantageous effect on the installation and removal of the components.

According to one embodiment of the present invention, provision is made for the blade bearing to comprise a first blade-bearing ring and a second blade-bearing ring, wherein the first blade-bearing ring is connected to the rotor-hub extension in a form-fitting manner or form-fitting and force-fitting manner or is designed in the form of part of the rotor-hub extension. It is thus advantageously possible, according to one embodiment of the present invention, for the first blade-bearing ring to be fixed (for example screwed) to the rotor-hub extension or for the first blade-bearing ring to be an integral part of the rotor-hub extension. In particular the integration of the first blade-bearing ring, that is to say preferably of the fixed part of the blade bearing, in the rotor-hub extension advantageously results in an increased level of rigidity of the blade bearing, in a reduction in the weight and in reduced costs, since a separate ring can be done away with. It is also possible for the rotor-hub extension to provide for easier removal, in particular in respect of a changeover or maintenance of the blade bearing. This is particularly advantageously made possible if the blade bearing (or a ring of the blade bearing) is designed in the form of part of the rotor-hub extension.

According to one embodiment of the present invention, provision is made for the first blade-bearing ring to be designed in the form of an inner blade-bearing ring and the second blade-bearing ring to be designed in the form of an outer blade-bearing ring, or for the first blade-bearing ring to be designed in the form of an outer blade-bearing ring and the second blade-bearing ring to be designed in the form of an inner blade-bearing ring. The outer blade-bearing ring is preferably the blade-bearing ring which is connected directly to the rotor-hub extension, whereas the inner blade-bearing ring is preferably the blade-bearing ring which is connected directly to the rotor blade. As an alternative, it is also possible for the inner blade-bearing ring to be preferably the blade-bearing ring which is connected directly to the rotor-hub extension, whereas the outer blade-bearing ring is preferably the blade-bearing ring which is connected directly to the rotor blade.

According to one embodiment of the present invention, provision is made for the second blade-bearing ring to be connected to the rotor blade directly or indirectly.

In particular it is possible for the second blade-bearing ring to be connected to the rotor blade directly, that is to say in particular without any adapter or intermediate piece. It is preferably possible here for the second blade-bearing ring to be connected to the rotor blade in a form-fitting manner or form-fitting and force-fitting manner with the aid of a fastening means (for example with the aid of screws).

According to one embodiment of the present invention, provision is made for an intermediate piece to be arranged between the blade bearing and the rotor blade. It is possible here in particular for the intermediate piece to be fastened on the blade bearing (in particular on the second blade-bearing ring) with the aid of a fastening means and to be fastened on the rotor blade with the aid of a fastening means. This can have an advantageous effect on the rigidity on the rotor-blade side of the connection structure. According to this embodiment, there is therefore an indirect connection between the blade bearing and the rotor blade.

According to one embodiment of the present invention, it is possible for the blade bearing to comprise a three-row roller-bearing slewing ring or to be designed in the form of a three-row roller-bearing slewing ring.

It is preferably possible for a nose to be arranged on the first or second blade-bearing ring, that is to say in particular on the inner or outer blade-bearing ring. It is also possible, according to one embodiment of the present invention, for the other blade-bearing ring (that is to say the blade-bearing ring on which the nose is not arranged) to be of two-part design.

As an alternative, it is possible, according to one embodiment of the present invention, for the blade bearing to comprise a toroidal bearing or to be designed in the form of a toroidal bearing, or for the blade bearing to comprise a four-point bearing or to be designed in the form of a four-point bearing, or for the blade bearing to comprise a double four-point bearing or to be designed in the form of a double four-point bearing. It is conceivable for the three-row roller-bearing slewing ring, the toroidal bearing, the four-point bearing or the double four-point bearing to have further additional bearing means. These can have further additional radial rollers and/or further additional axial rollers. It is also conceivable for the blade bearing to comprise a four-row roller-bearing slewing ring (4RD), crossed-roller bearing or double crossed-roller bearing or to be designed in the form of a four-row roller-bearing slewing ring (4RD), crossed-roller bearing or double crossed-roller bearing.

A three-row roller-bearing slewing ring (3RD) has a longer service life than a four-point bearing or double four-point bearing and, if it is of identical overall size, can transmit higher forces. This is advantageous in particular for wind turbines of ever-increasing size. According to one embodiment of the present invention, in respect of the use of the three-row roller-bearing slewing ring, the rotor-hub extension allows for an advantageously increased level of rigidity, which is advantageous for the 3RD. This is the case, in particular, since the force transmission from the end of the rotor blade to the rotor-hub extension provides for force transmission from tube to tube which is distributed more uniformly than force transmission from bearing to rotor hub. In particular the axial force transmission from rotor blade to rotor-hub extension is more uniform than from rotor blade, via blade bearing, directly to the rotor hub.

In contrast, if there were a direct connection to the rotor hub, the uniform axial rigidity would not be ensured to this extent, and therefore the hub connection to the blade bearing can undergo oval deformation, in dependence on the structural shape of the bearing. Therefore, according to one embodiment of the present invention, the lack of uniformity of the rotor hub (in particular of a spherical hub) is advantageously reduced/compensated for by the rotor-hub extension. The rotor-hub extension can therefore ensure a uniform level of axial rigidity at the blade connection.

According to one embodiment of the present invention, provision is made for the rotor-hub extension to be formed separately from the rotor hub. It is thus possible for the rotor-hub extension to be a separate part (separate from the rotor hub), which is fitted on the rotor hub or connected (for example screwed) to the rotor hub. This has a particularly advantageous effect on the installation and removal of the rotor-hub extension and, at the same time, can result in an improved level of rigidity in the connection region/connecting region of the rotor hub by way of the rotor-hub extension.

According to one embodiment of the present invention, provision is made for the rotor-hub extension to be arranged on the rotor hub in an immovable manner, and in particular in a form-fitting manner or form-fitting and force-fitting manner. It is thus advantageously possible, according to one embodiment of the present invention, for the rotor-hub extension to be fitted on (for example screwed to) the rotor hub in a fixed state by means of a fastening means. This means that, even during operation of the wind turbine, there is no relative movement taking place between the rotor hub and the rotor-hub extension.

According to one embodiment of the present invention, provision is made for a pitch drive to be designed in the form of part of the rotor-hub extension or to be arranged within the rotor-hub extension. The pitch drive is designed here preferably for adjusting the positioning angle of the rotor blade (in particular with the aid of the blade bearing).

According to one embodiment of the present invention, provision is made for the rotor-hub extension to comprise a first hub-extension component and a second hub-extension component, wherein the first and the second hub-extension components are formed preferably parallel to the main axis of rotation of the blade bearing, in particular as sub-shells of the rotor-hub extension. It is thus possible, according to one embodiment of the present invention, to allow for particularly advantageous maintenance and removal of the rotor-hub extension. It is conceivable for the rotor-hub extension to have at least one further hub-extension component. It is possible for the first and second hub-extension components to be formed parallel to the main axis of rotation of the blade bearing or else at an angle thereto. In both cases, it is in particular possible for the rotor-hub extensions to be designed in the form of. Quite particular advantages are achieved for the case where the first blade-bearing ring is designed in the form of part of the rotor-hub extension or is integrated in the rotor-hub extension. This allows for removal and maintenance of the blade bearing, or the components thereof, in the installed state. It would be possible for example for one of the hub-extension components (with integrated blade-bearing ring) to be removed and thus for the interior of the blade bearing to be reached for the maintenance or changeover of components. All that would be required therefore would be for one of the hub-extension components (in particular half-shells), rather than the entire rotor blade (with blade-bearing ring), to be removed. The removal and maintenance here expediently take place in the 12 o'clock position or in the 6 o'clock position of the rotor blade, that is to say when the longitudinal axis of the rotor blade is running parallel to the longitudinal axis of the tower of the wind turbine. In these positions, there are essentially no bending moments acting on the remaining hub-extension component.

According to one embodiment of the present invention, provision is made for the rotor-hub extension, in particular the first and/or second hub-extension component, to have ribs, preferably on the inner side of the rotor-hub extension. This advantageously makes it possible to achieve a particularly improved level of rigidity, which has an advantageous effect on weight optimization and the scaling options.

According to one embodiment of the present invention, provision is made for a nose to be arranged on the first blade-bearing ring or the second blade-bearing ring. Provision is made in particular for a nose to be arranged on the inner or outer blade-bearing ring. It is also conceivable for the other blade-bearing ring, on which the nose is not arranged, to be of two-part design. It is thus, for example, conceivable for the blade-bearing ring on which the nose is not arranged to be part of the rotor-hub extension, and therefore for the blade-bearing ring on which the nose is not arranged to be integrated in the rotor-hub extension. However, it is also conceivable for the blade-bearing ring on which the nose is not arranged to be part of the rotor-hub extension only to some extent. In this case, the wind turbine preferably has a bearing part which, together with the rotor-hub extension, forms the blade-bearing ring on which the nose is not arranged. The bearing part is fixed on the rotor-hub extension preferably by means of a screw connection. The nose has preferably three running surfaces for rolling bodies, wherein one running surface is arranged parallel to the axis of rotation of the blade bearing and two running surfaces are arranged orthogonally in relation to the axis of rotation of the blade bearing. This allows for the use of a three-row roller-bearing slewing ring (3RD). It is also conceivable for use to be made of a four-row roller-bearing slewing ring (4RD).

According to one embodiment of the present invention, provision is made for the rotor-hub extension to have at least one through-passage opening for the through-passage of a fastening element for fastening the rotor blade on the blade bearing and/or a tool essentially parallel to the main axis of rotation of the blade bearing. If the rotor-hub extension is designed to some extent in the form of an outer blade-bearing ring, then, during installation, the rotor blade can be fastened to the inner blade-bearing ring through the at least one through-passage opening. The rotor blade can be fastened for example by screw connection. For this purpose, the at least one through-passage opening is of sufficient dimensions and is arranged parallel to a fastening opening in the inner blade-bearing ring, said fastening opening being provided in order for the rotor blade to be fastened to the inner blade-bearing ring. The cross section of the at least one through-passage opening is preferably circular, but can also be oval or polygonal. It is conceivable for the at least one through-passage opening to have centering aids for centering the fastening element during installation of the rotor blade.

According to one embodiment of the present invention, provision is made for the rotor-hub extension to be produced by means of a forming process.

As an alternative, it is also conceivable for the rotor-hub extension to be produced in the form of a casting, by means of a casting process, or in the form of a welded structure, by means of welding.

The invention also relates to a rotor system for a wind turbine comprising a rotor hub, a blade bearing and a rotor blade, characterized in that a conical rotor-hub extension is arranged between the rotor hub and the blade bearing, wherein the rotor-hub extension has a first diameter on its side which is directed toward the blade bearing and a second diameter on its side which is directed toward the rotor hub, wherein the first diameter is greater than the second diameter, wherein the rotor blade is connected to the blade bearing directly or indirectly.

The invention also relates to a method for using a wind turbine according to any embodiment of the present invention, wherein the rotor blade is moved relative to the rotor hub and the rotor-hub extension, wherein the rotor hub and the rotor-hub extension are in a fixed state relative to one another.

As far as the rotor system according to the invention and the method according to the invention for using a wind turbine are concerned, use can be made of the features and configurations which have been described in conjunction with the wind turbine according to the invention and/or any embodiment of the wind turbine. As far as the rotor system according to the invention and the method according to the invention for using a wind turbine are concerned, it is likewise possible to achieve the advantages already described in conjunction with the wind turbine according to the invention and/or any embodiment of the wind turbine.

Figure 2:
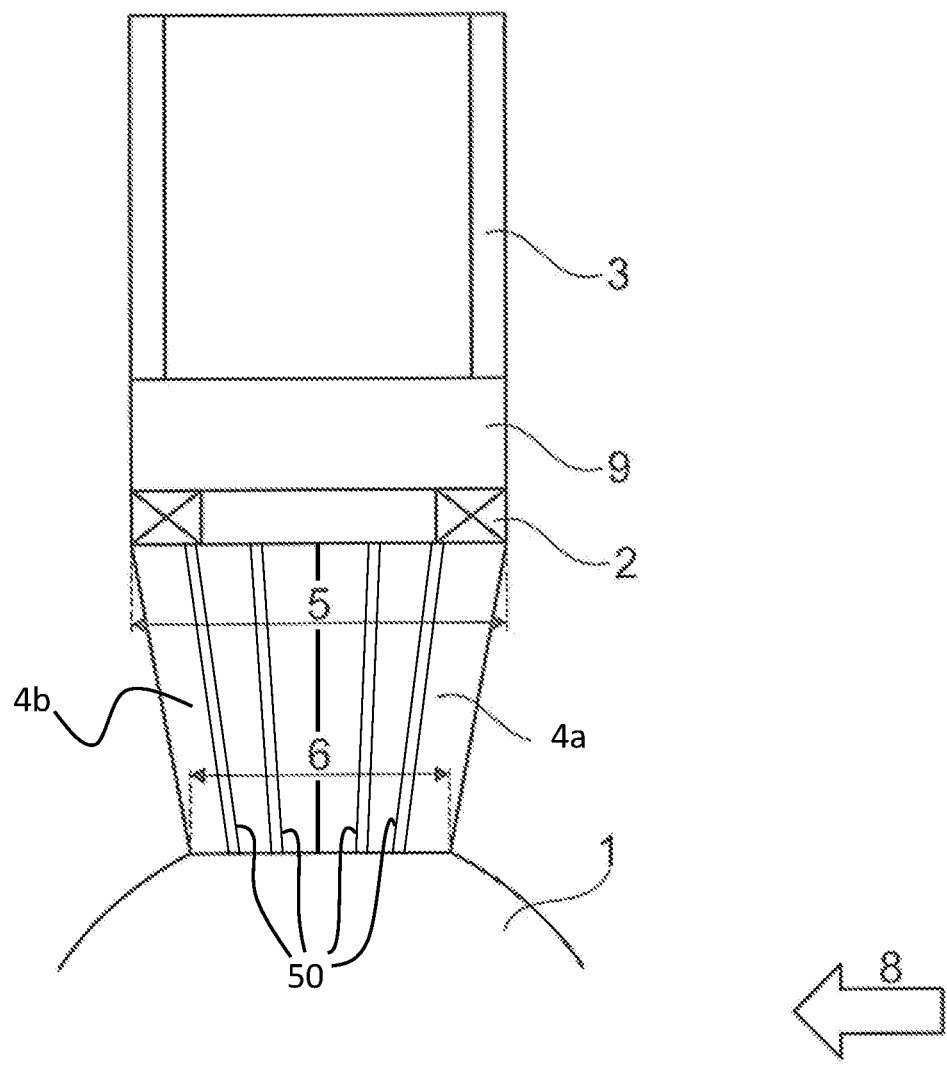
FIG. 2 is a schematic view of a sub-region of a wind turbine according to one example.

FIG. 1 illustrates, schematically, a sub-region of a wind turbine according to one embodiment of the present invention. It illustrates in particular a sub-region of a rotor system having a rotor hub 1. The rotor hub 1 is connected to a rotor-hub extension 4, which is designed in the form of a part which is separate from the rotor hub 1. The rotor-hub extension 4 and the rotor hub 1 here are arranged in an immovable manner in relation to one another, and therefore, during operation, there is no relative movement taking place between the rotor-hub extension 4 and the rotor hub 1. A blade bearing 2 is fitted at that end of the rotor-hub extension 4 which is directed away from the rotor hub 1. The rotor-hub extension 4 tapers in the direction of the rotor hub 1 and is conical. This means that a first diameter 5 of the rotor-hub extension 4 at the blade-bearing end of the rotor-hub extension 4 is greater than a second diameter 6 of the rotor-hub extension 4 at the rotor-hub end of the rotor-hub extension 4. A region around the blade bearing 2 is illustrated on an enlarged scale in FIG. 1 within the circle outlined by dashes. A three-row roller-bearing slewing ring is illustrated here. It is possible according to the invention for the blade bearing 2 to comprise a first and a second blade-bearing ring 10, 11. The first blade-bearing ring 10 here either is installed on the rotor-hub extension 4 or is integrated directly in the rotor-hub extension 4 (that is to say is designed in the form of part of the rotor-hub extension 4, as illustrated in FIG. 1). In the case of the embodiment which is illustrated in FIG. 1, the second blade-bearing ring 11 is connected to the rotor blade 3 directly. As shown in FIG. 2, the rotor-hub extension 4 may comprise a first hub-extension component 4a and a second hub-extension component 4b that have ribs 50 that provide rigidity, wherein the first and second hub-extension components 4a, 4b are formed preferably parallel to the main axis of rotation of the blade bearing 2, in particular as sub-shells of the rotor-hub extension 4. The arrow 8 symbolizes wind acting on the wind turbine.

FIG. 2 illustrates, schematically, a sub-region of a wind turbine according to one embodiment of the present invention. In contrast to the embodiment which is illustrated in FIG. 1, an intermediate piece 9 is present between the blade bearing 2 and the rotor blade 3, said intermediate piece being designed, in particular, in the form of a separate part and being connected to the blade bearing 2 (in particular to the second blade-bearing ring 11) and also to the rotor blade 3. The intermediate piece 9 here can be of different shapes, for example cylindrical or conical.

Figure 3:
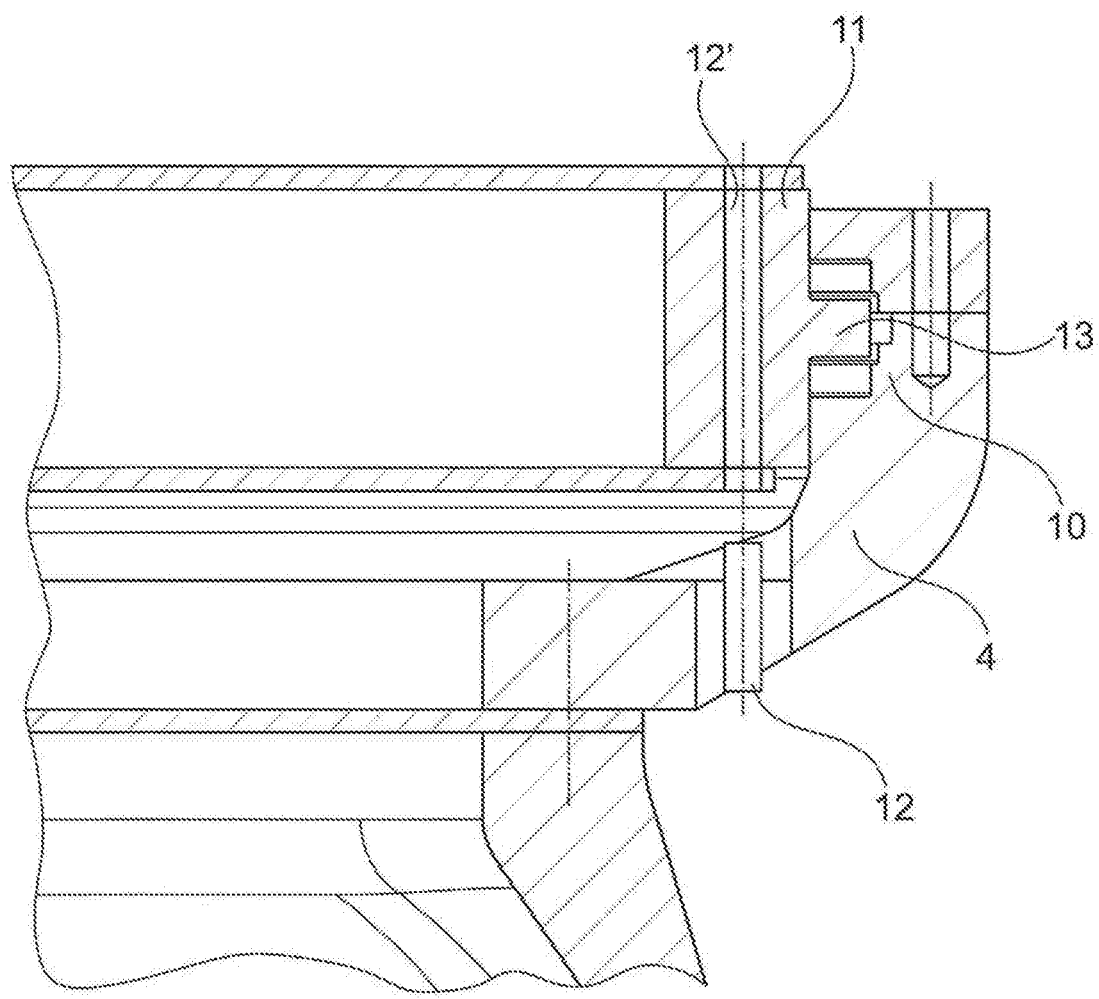
FIG. 3 is a schematic view of a sub-region of a wind turbine according to one example.

FIG. 3 illustrates, schematically, a sub-region of a wind turbine according to one embodiment of the present invention. The rotor-hub extension 4, designed, in the illustrated embodiment of the present invention, in the form of a first blade-bearing ring 10, has the through-passage opening 12, through which, during the installation and removal of the rotor blade 3 (not shown here), the rotor blade 3 is screwed to the second blade-bearing ring 11 with the aid of the fastening opening 12'. The second blade-bearing ring 11 has the nose 13, which, in the illustrated embodiment of the present invention, is directed outward. In alternative embodiments of the present invention, it is possible for the nose 13 to be arranged on the first blade-bearing ring 10 and to be oriented inward. Inward and outward here relate to a surface which is enclosed by the blade bearing and is orthogonal in relation to the axis of rotation of the blade bearing. The rotating blade-bearing ring here is the second blade-bearing ring 11.

Figure 4:
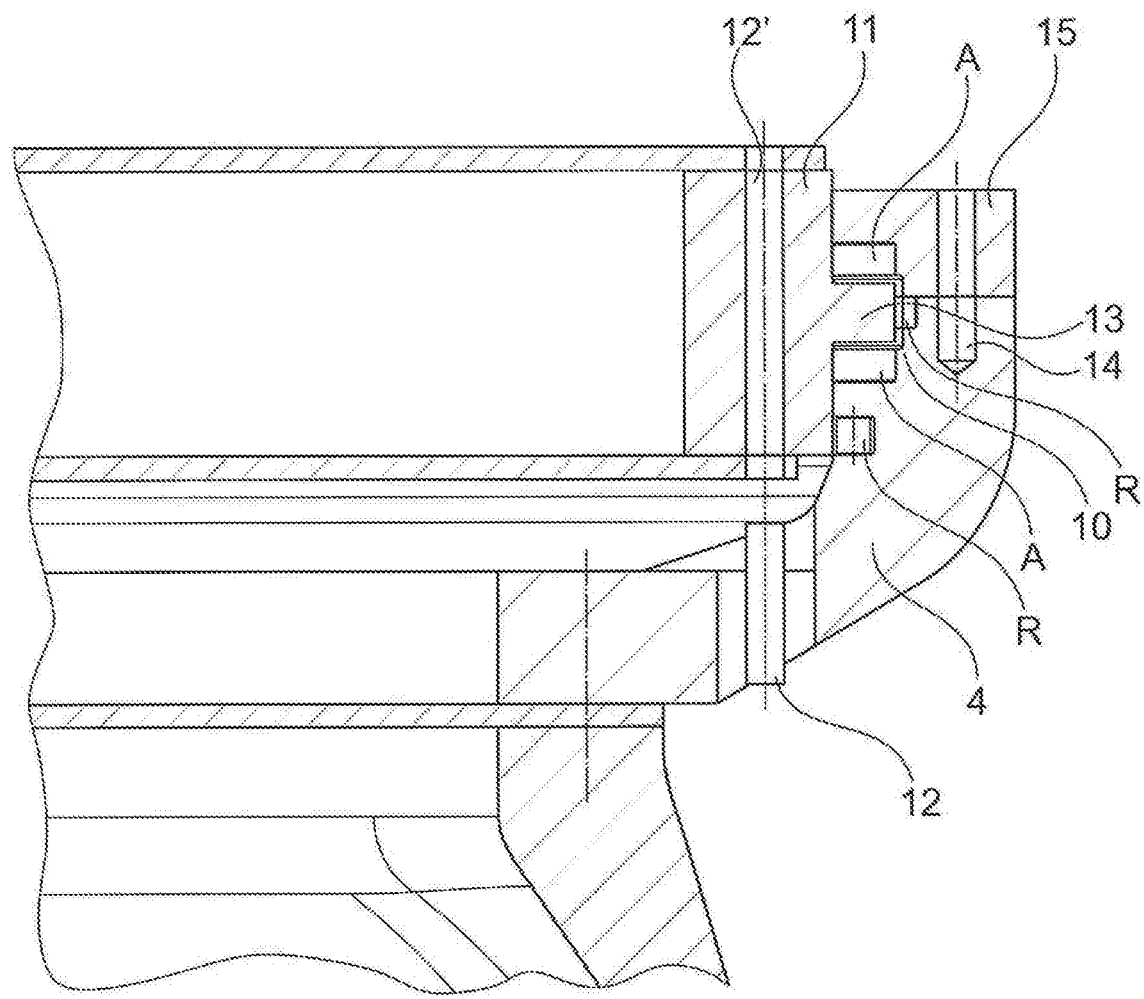
FIG. 4 is a schematic view of a sub-region of a wind turbine according to one example.

FIG. 4 shows, schematically, a sub-region of a wind turbine according to a further embodiment of the present invention. The rotor-hub extension 4, designed, in the illustrated embodiment of the present invention, in the form of a first blade-bearing ring 10, has the through-passage opening 12, through which, during the installation and removal of the rotor blade 3 (not shown here), the rotor blade 3 is screwed to the second blade-bearing ring 11 with the aid of the fastening opening 12'. The second blade-bearing ring 11 has the nose 13, which, in the illustrated embodiment of the present invention, is directed outward. In alternative embodiments of the present invention, it is possible for the nose 13 to be arranged on the first blade-bearing ring 10 and to be oriented inward. A four-row roller-bearing slewing ring (4RD) having the axial rollers A and the radial rollers R is illustrated. The 4RD is integrated at least to some extent in the rotor-hub extension 4; the rotor-hub extension 4 forms the first blade-bearing ring 10 at least to some extent. The wind turbine illustrated also has the bearing part 15, which is fixed on the rotor-hub extension 4 by means of the screw connection 14. The rotating blade-bearing ring here is the second blade-bearing ring 11.

Figure 5:
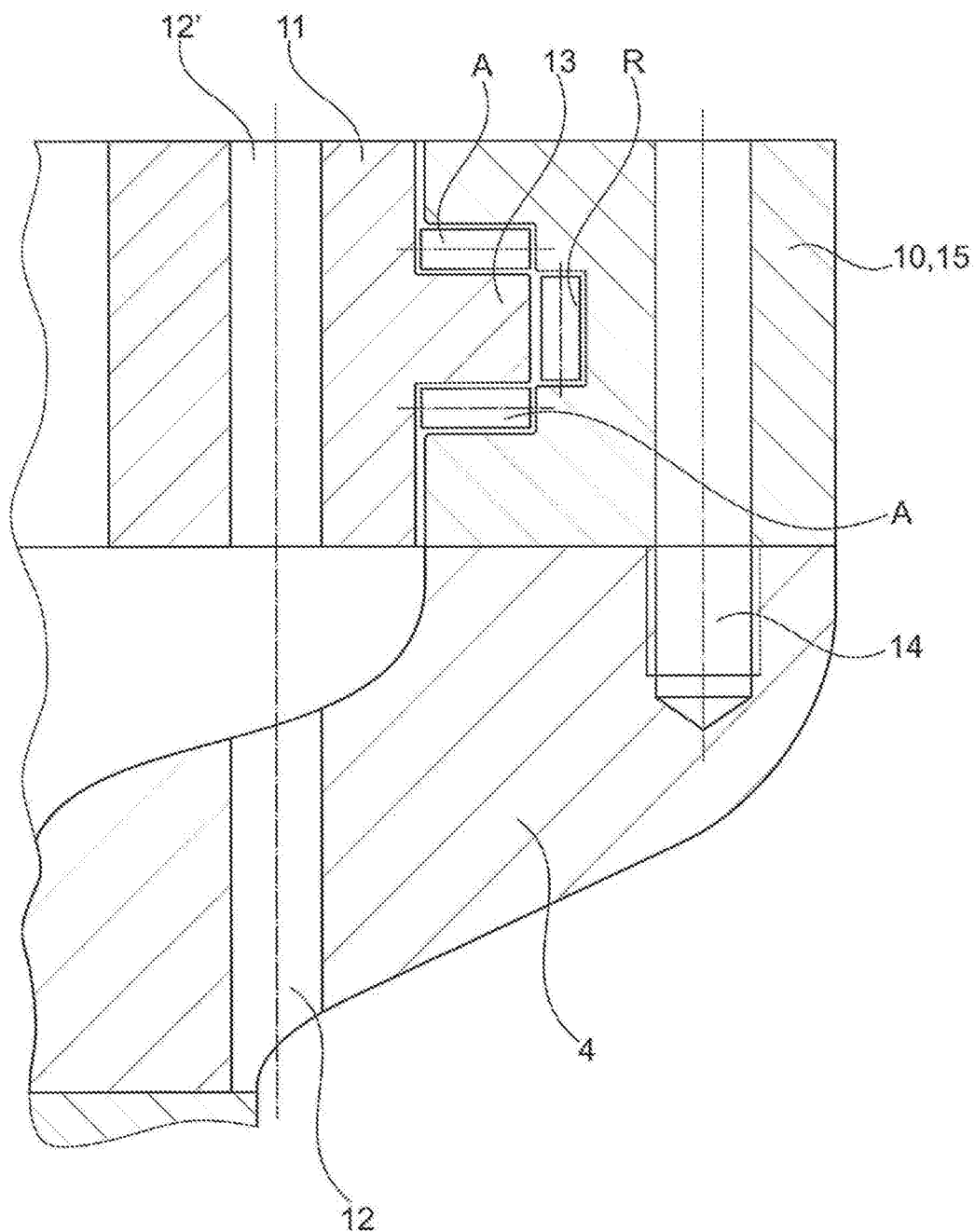
FIG. 5 is a schematic view of a sub-region of a wind turbine according to one example.

FIG. 5 illustrates a sub-region of a wind turbine according to a further embodiment of the present invention. Like the wind turbine which is illustrated in FIG. 3, the wind turbine which is shown here has the rotor-hub extension 4, the through-passage opening 12, the fastening opening 12' and the second blade-bearing ring 11 with the nose 13. The bearing means here is likewise a three-row roller-bearing slewing ring 3RD. The first blade-bearing ring 10, rather than being integrated in the rotor-hub extension 4, is fixed, in the form of a bearing part 15, on the rotor-hub extension 4 by means of the screw connection 14. The rotating blade-bearing ring here is the second blade-bearing ring 11.

Figure 6:
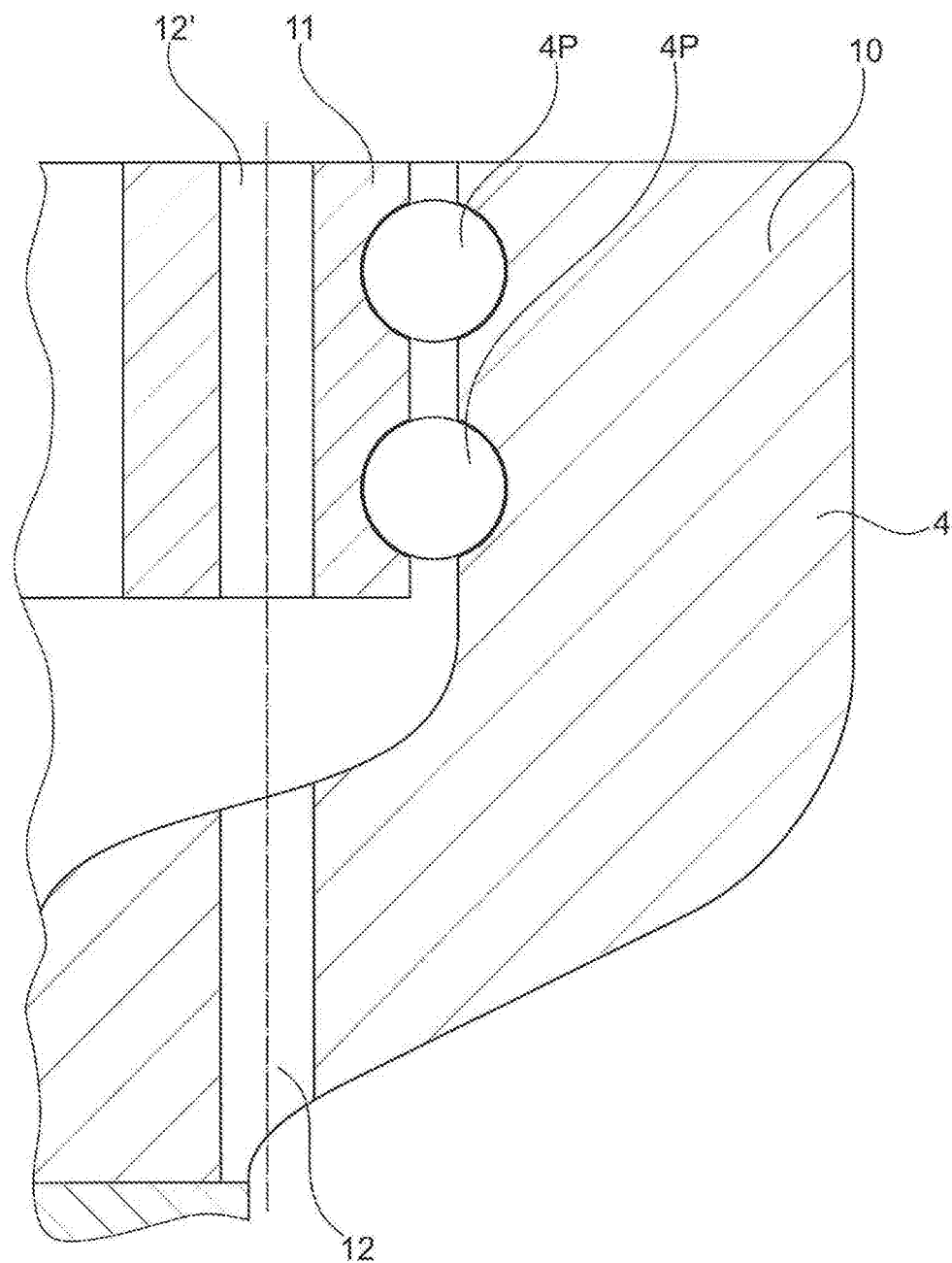
FIG. 6 is a schematic view of a sub-region of a wind turbine according to one example.

FIG. 6 shows, schematically, a sub-region of a wind turbine according to a further embodiment of the present invention. It illustrates the rotor-hub extension 4, the through-passage opening 12, the fastening opening 12' and the second blade-bearing ring 11. The wind turbine illustrated has a double four-point bearing having two rows of balls. The first blade-bearing ring 10 is integrated in the rotor-hub extension 4. The rotating blade-bearing ring here is the second blade-bearing ring 11.

Figure 7:
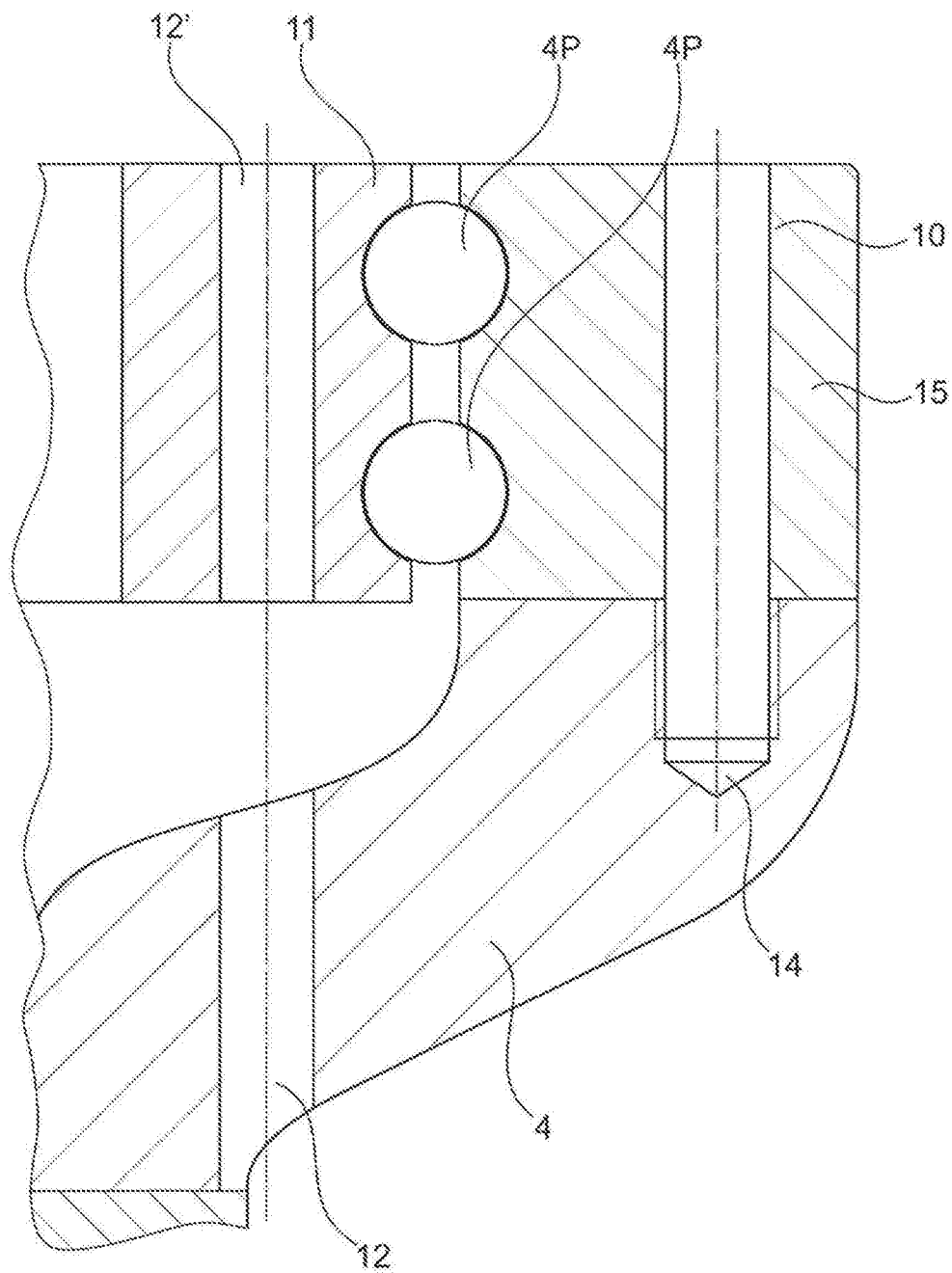
FIG. 7 is a schematic view of a sub-region of a wind turbine according to one example.

FIG. 7 shows, schematically, a sub-region of a wind turbine according to a further embodiment of the present invention. It illustrates the rotor-hub extension 4, the through-passage opening 12, the fastening opening 12' and the second blade-bearing ring 11. The wind turbine illustrated has a double four-point bearing having two four-point bearings 4P. The bearing part 15 is fixed on the rotor-hub extension 4 by means of the screw connection 14 and forms the first blade-bearing ring 10. The rotating blade-bearing ring here is the second blade-bearing ring 11.

Figure 8:
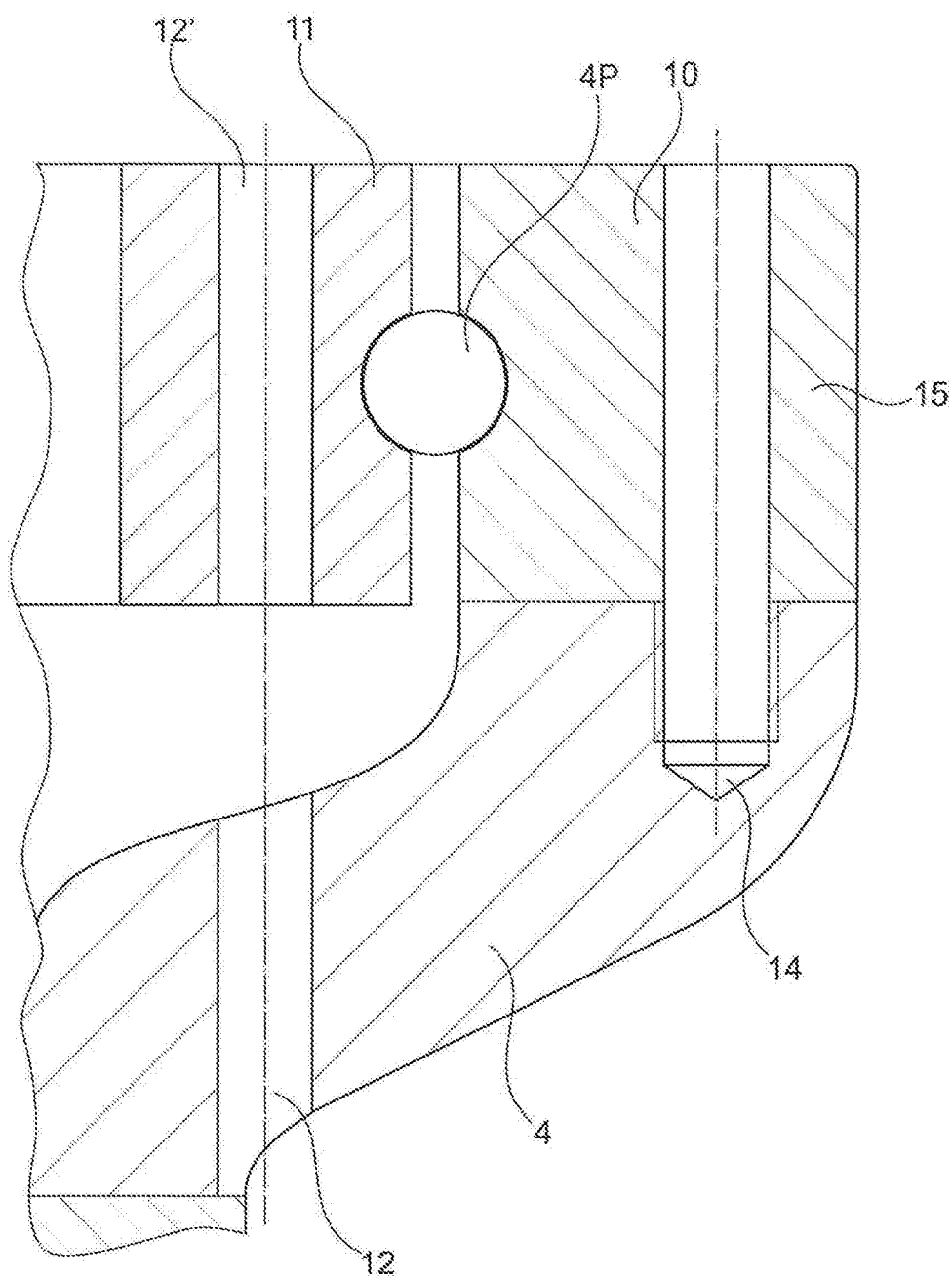
FIG. 8 is a schematic view of a sub-region of a wind turbine according to one example.

FIG. 8 shows, schematically, a sub-region of a wind turbine according to a further embodiment of the present invention. It illustrates the rotor-hub extension 4, the through-passage opening 12, the fastening opening 12' and the second blade-bearing ring 11. The wind turbine illustrated has a four-point bearing 4P. The bearing part 15 is fixed on the rotor-hub extension 4 by means of the screw connection 14 and forms the first blade-bearing ring 10. The rotating blade-bearing ring here is the second blade-bearing ring 11.

Figure 9:
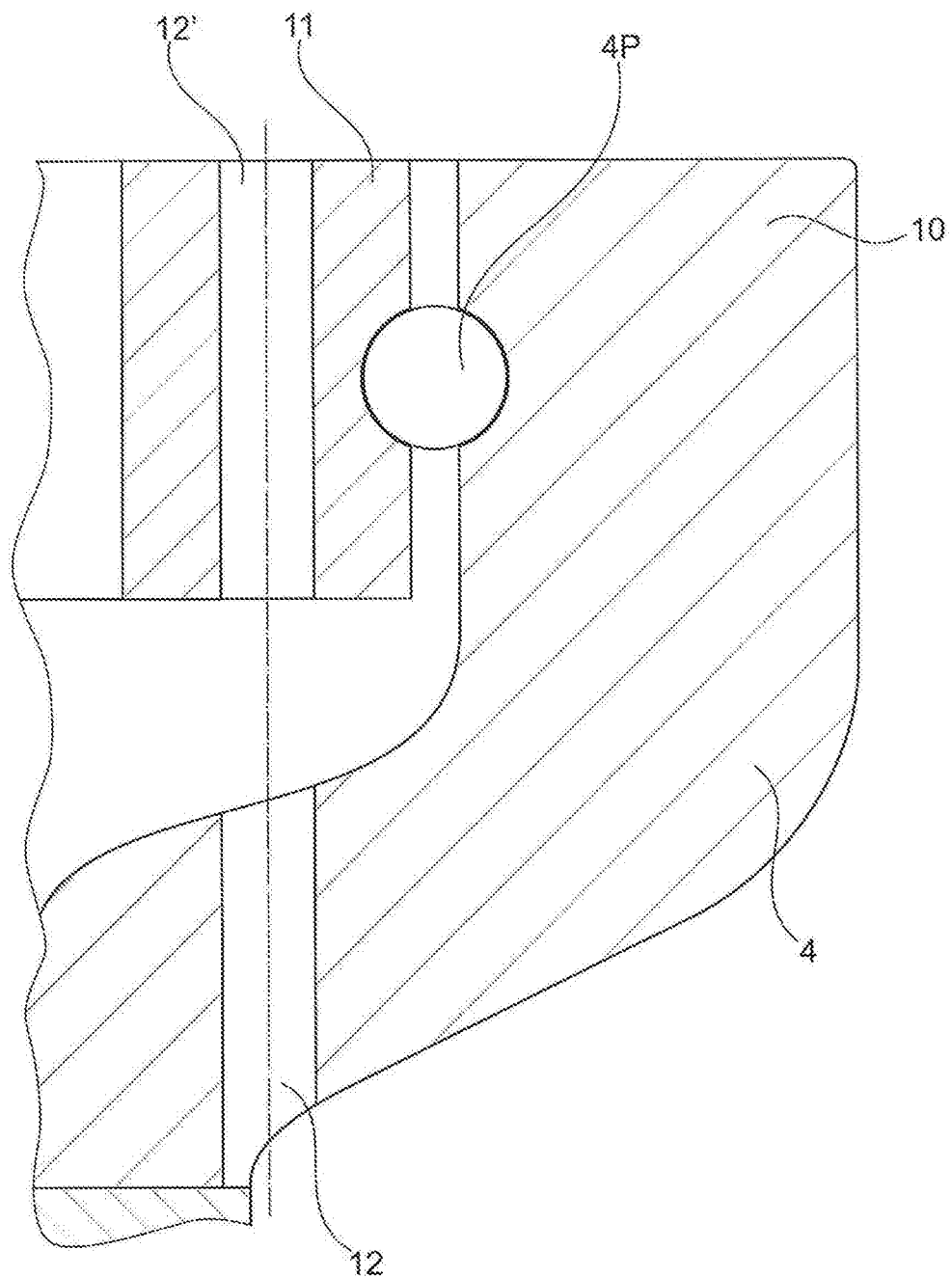
FIG. 9 is a schematic view of a sub-region of a wind turbine according to one example.

FIG. 9 shows, schematically, a sub-region of a wind turbine according to a further embodiment of the present invention. It illustrates the rotor-hub extension 4, the through-passage opening 12, the fastening opening 12' and the second blade-bearing ring 11. The wind turbine illustrated has a four-point bearing 4P. The first blade-bearing ring 10 is integrated in the rotor-hub extension 4. The rotating blade-bearing ring here is the second blade-bearing ring 11.

Figure 10:
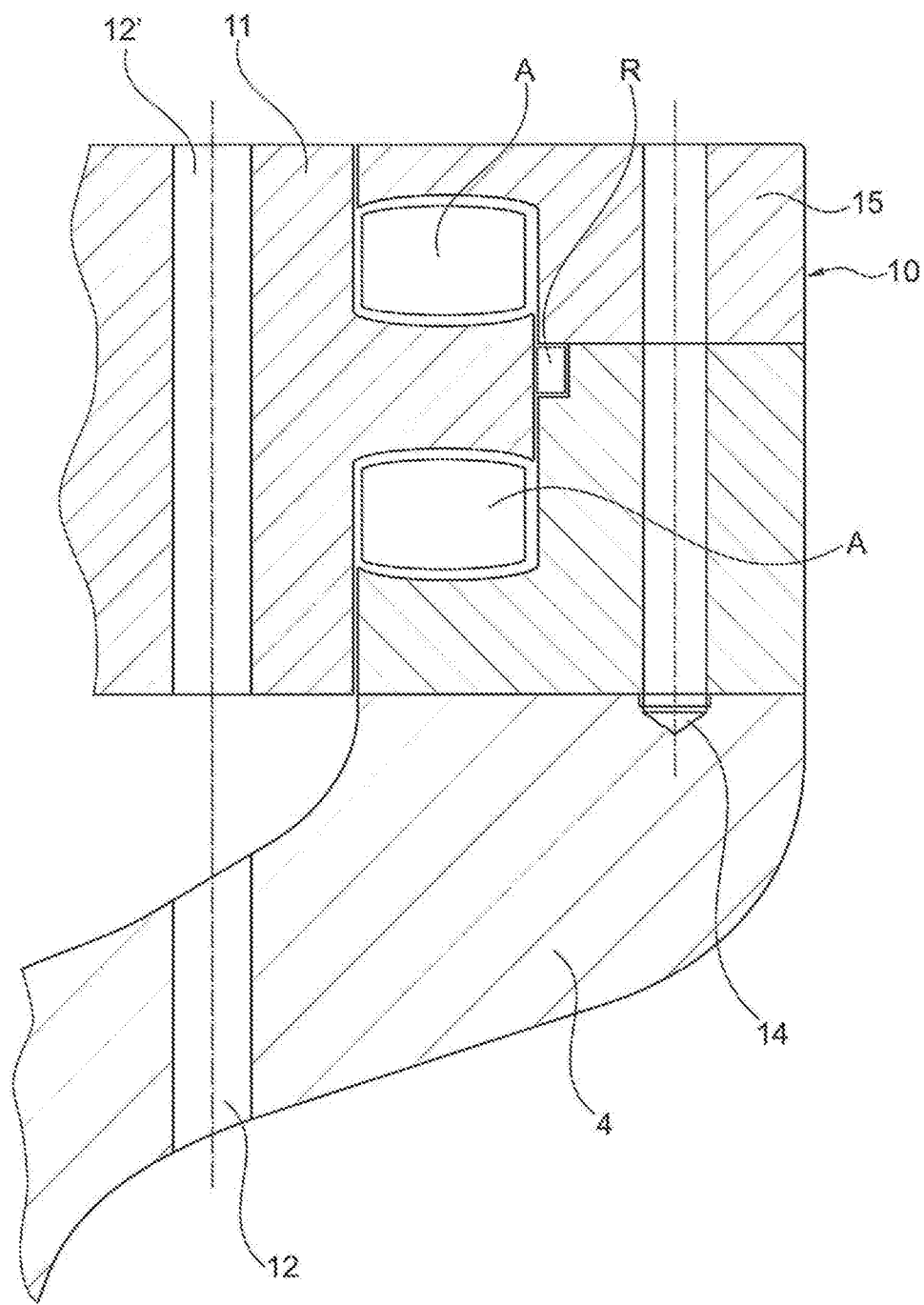
FIG. 10 is a schematic view of a sub-region of a wind turbine according to one example.

FIG. 10 illustrates a sub-region of a wind turbine according to a further embodiment of the present invention. It illustrates the rotor-hub extension 4, the through-passage opening 12, the fastening opening 12' and the second blade-bearing ring 11. The wind turbine illustrated has a toroidal bearing having the barrel-shaped axial rollers A and the radial rollers R. The bearing part 15 is fixed on the rotor-hub extension 4 by means of the screw connection 14 and forms the first blade-bearing ring 10. In an embodiment which is not illustrated here, the first blade-bearing ring 10 can also be integrated at least to some extent in the rotor-hub extension 4. The rotating blade-bearing ring here is the second blade-bearing ring 11.

Figure 11:
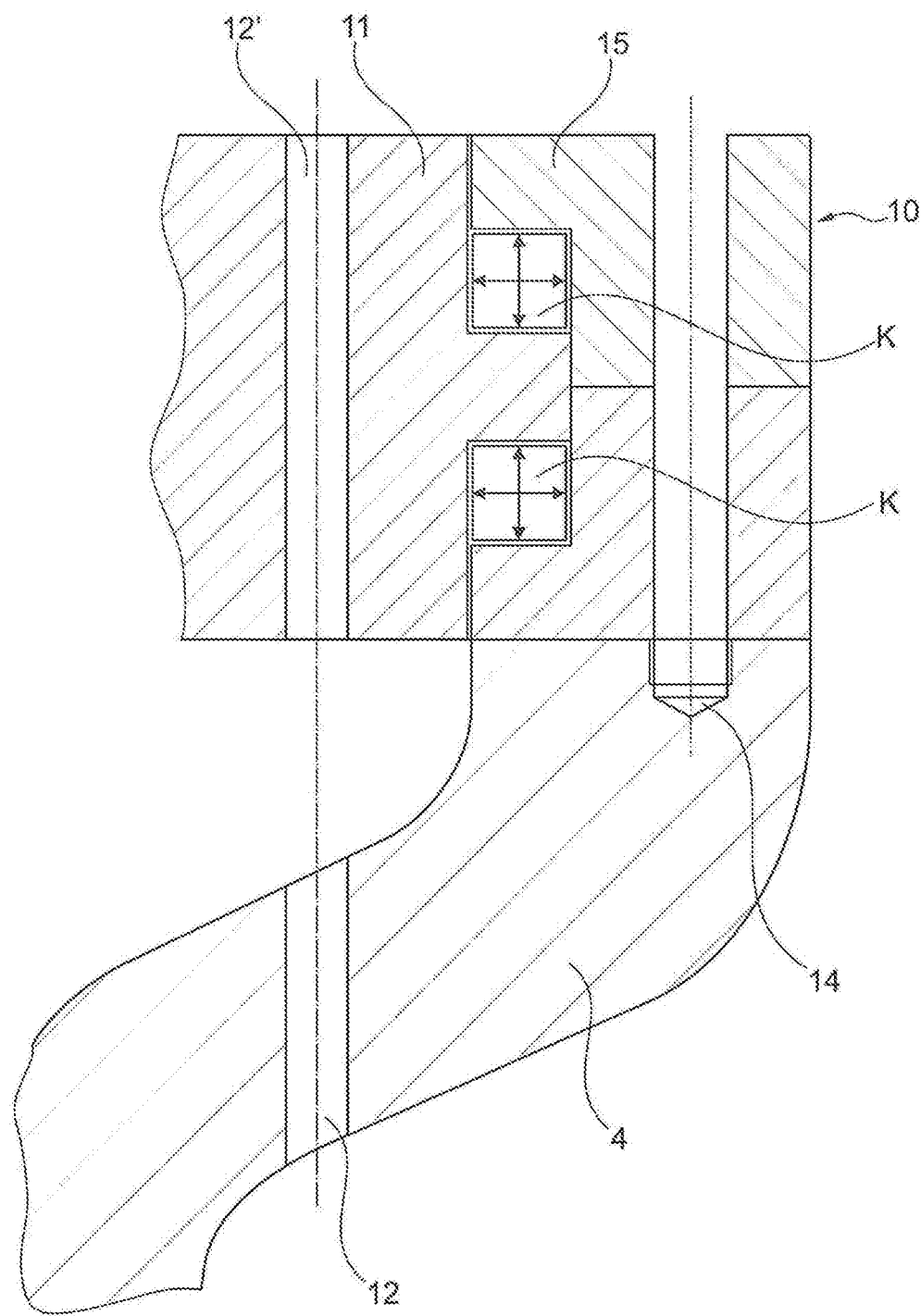
FIG. 11 is a schematic view of a sub-region of a wind turbine according to one example.

FIG. 11 shows, schematically, a sub-region of a wind turbine according to a further embodiment of the present invention. It illustrates the rotor-hub extension 4, the through-passage opening 12, the fastening opening 12' and the second blade-bearing ring 11. The wind turbine illustrated has a double crossed-roller bearing having two rows of crossed rollers K. The bearing part 15 is fixed on the rotor-hub extension 4 by means of the screw connection 14 and forms the first blade-bearing ring 10. In an embodiment which is not illustrated here, the first blade-bearing ring 10 can also be integrated at least to some extent in the rotor-hub extension 4. The rotating blade-bearing ring here is the second blade-bearing ring 11.

Figure 12:
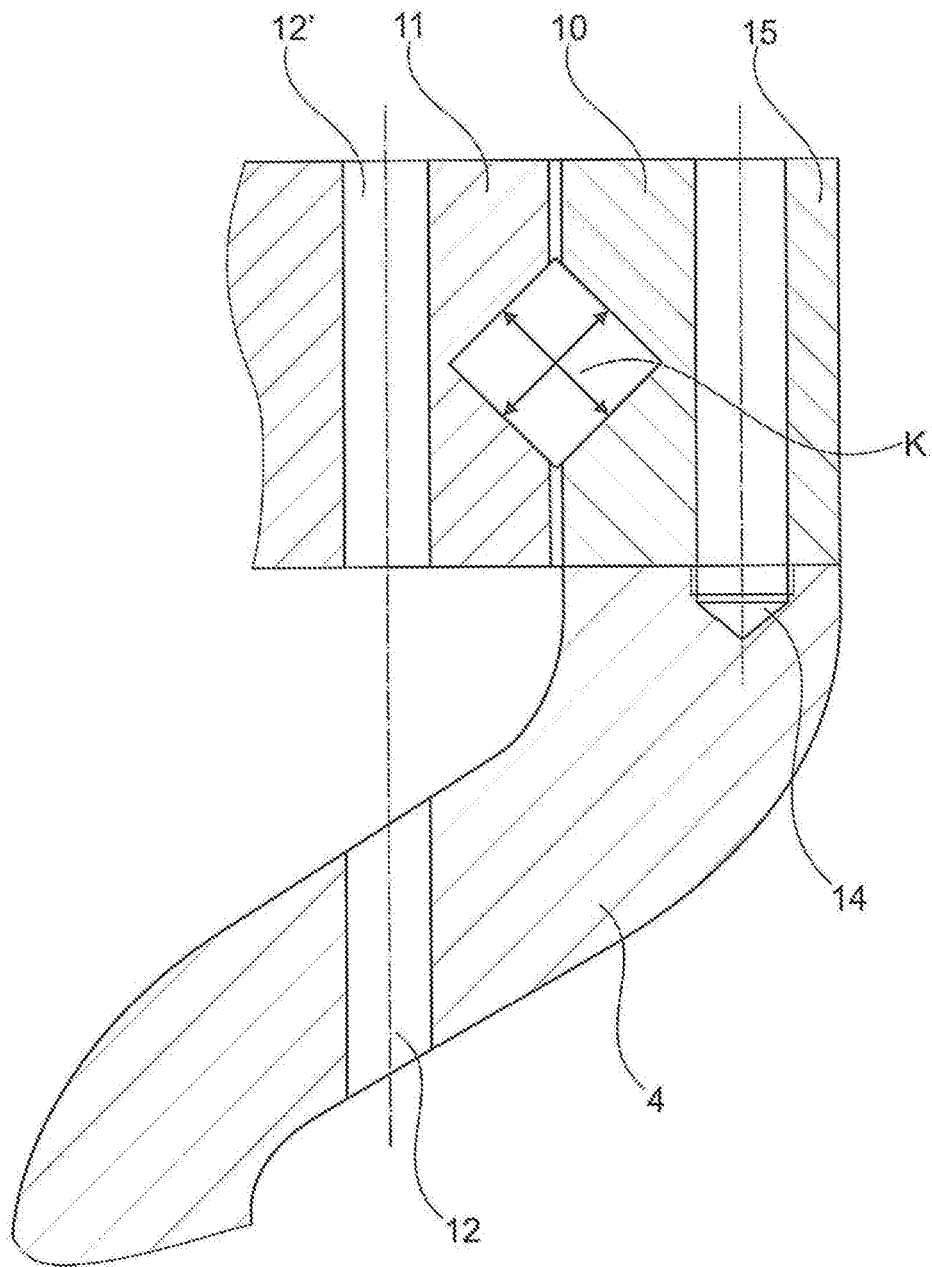
FIG. 12 is a schematic view of a sub-region of a wind turbine according to one example.

FIG. 12 shows, schematically, a sub-region of a wind turbine according to a further embodiment of the present invention. It illustrates the rotor-hub extension 4, the through-passage opening 12, the fastening opening 12' and the second blade-bearing ring 11. The wind turbine illustrated has a crossed-roller bearing having a single row of crossed rollers K. The bearing part 15 is fixed on the rotor-hub extension 4 by means of the screw connection 14 and forms the first blade-bearing ring 10. In an embodiment which is not illustrated here, the first blade-bearing ring 10 can also be integrated at least to some extent in the rotor-hub extension 4. The rotating blade-bearing ring here is the second blade-bearing ring 11.

Figure 13:
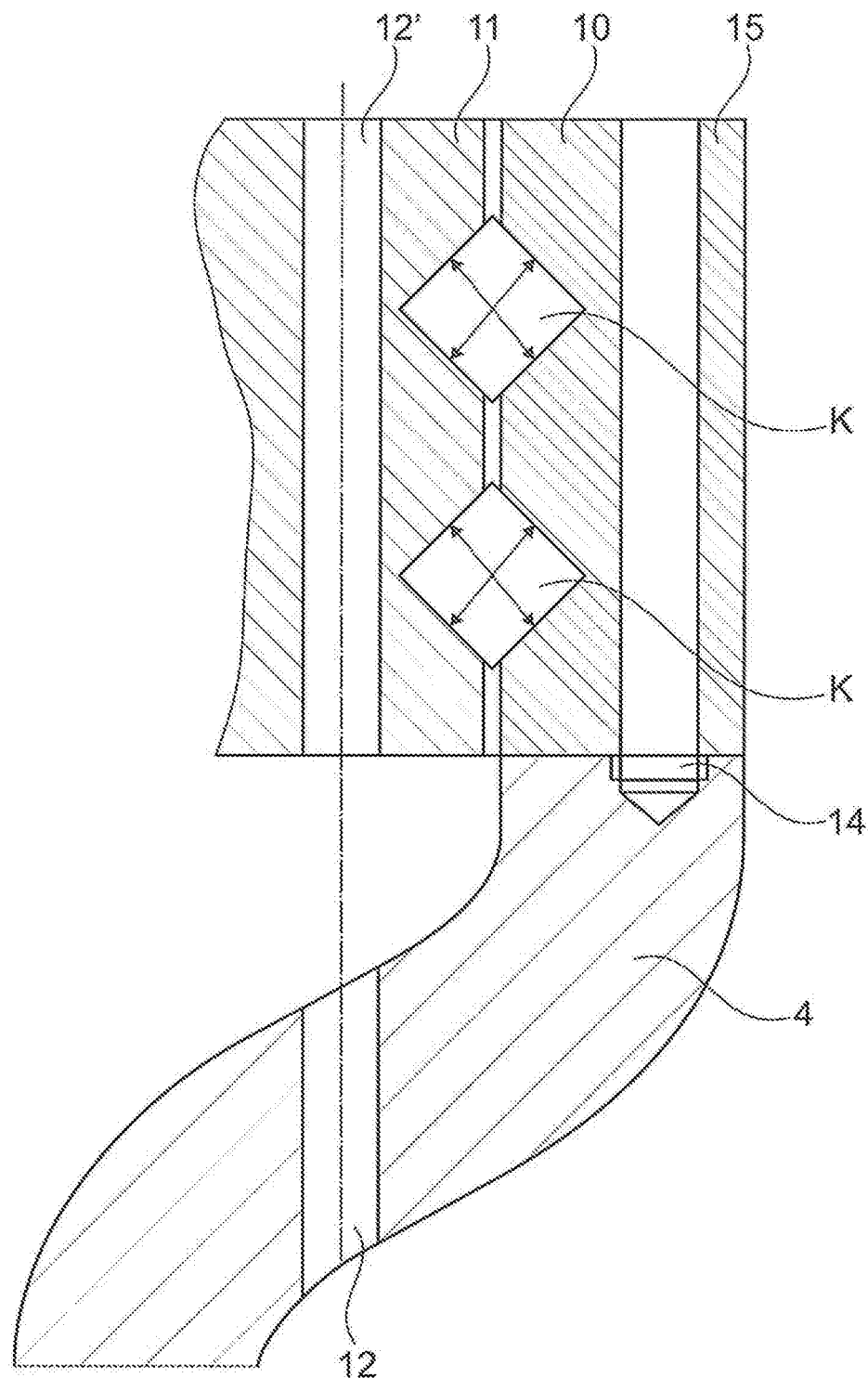
FIG. 13 is a schematic view of a sub-region of a wind turbine according to one example.

FIG. 13 shows, schematically, a sub-region of a wind turbine according to a further embodiment of the present invention. It illustrates the rotor-hub extension 4, the through-passage opening 12, the fastening opening 12' and the second blade-bearing ring 11. The wind turbine illustrated has a double crossed-roller bearing having two rows of crossed rollers K, wherein the two rows of crossed rollers K are tilted through 45° in comparison with the embodiment which is illustrated in FIG. 11. The bearing part 15 is fixed on the rotor-hub extension 4 by means of the screw connection 14 and forms the first blade-bearing ring 10. In an embodiment which is not illustrated here, the first blade-bearing ring 10 can also be integrated at least to some extent in the rotor-hub extension 4. The rotating blade-bearing ring here is the second blade-bearing ring 11.

FIG. 14 shows another example blade bearing 2' with a first blade-bearing ring 10' configured as an inner blade-bearing ring and a second blade-bearing ring 11' configured as an outer blade-bearing ring. The first blade-bearing ring 10' may be connected to a conical rotor-hub extension 4' in a form-fitting manner or in a form- and force-fitting manner.

LIST OF REFERENCE SIGNS

1 Rotor hub
2 Blade bearing
3 Rotor blade
4 Rotor-hub extension
5 First diameter
6 Second diameter
8 Wind
9 Intermediate piece
10 First blade-bearing ring
11 Second blade-bearing ring
12 Through-passage opening
12' Fastening opening
13 Nose
14 Screw connection
15 Bearing part
A Axial roller
K Crossed-roller bearing
R Radial roller
4P Four-point bearing

What is claimed is:

1. A wind turbine comprising:
a rotor hub;
a blade bearing;
a rotor blade that is connected directly or indirectly to the blade bearing; and
a conical rotor-hub extension disposed between the rotor hub and the blade bearing, wherein the conical rotor-hub extension has a first diameter on a first side directed toward the blade bearing and a second diameter on a second side directed toward the rotor hub, wherein the first diameter is greater than the second diameter,
wherein a surface of the conical rotor-hub extension that is oblique to a main axis of rotation of the blade bearing includes a through-passage opening for through-passage of at least one of a tool or a fastening element for fastening the rotor blade on the blade bearing, wherein the through-passage opening extends parallel to the main axis of rotation of the blade bearing, wherein the through-passage opening extends parallel to a fastening opening in the blade bearing for fastening the rotor blade to the blade bearing, with center lines of the through-passage opening and the fastening opening being aligned.

2. The wind turbine of claim 1 wherein the blade bearing comprises a first blade-bearing ring and a second blade-bearing ring, wherein the first blade-bearing ring is connected to the conical rotor-hub extension in a form-fitting manner, in a form- and force-fitting manner, or in a form configured as part of the conical rotor-hub extension.

3. The wind turbine of claim 2 wherein the first blade-bearing ring is configured as an inner blade-bearing ring and the second blade-bearing ring is configured as an outer blade-bearing ring.

4. The wind turbine of claim 2 wherein the first blade-bearing ring is configured as an outer blade-bearing ring and the second blade-bearing ring is configured as an inner blade-bearing ring.

5. The wind turbine of claim 2 wherein the second blade-bearing ring is connected to the rotor blade directly.

6. The wind turbine of claim 2 wherein the second blade-bearing ring is connected to the rotor blade indirectly.

7. The wind turbine of claim 1 comprising an intermediate piece disposed between the blade bearing and the rotor blade.

8. The wind turbine of claim 1 wherein the conical rotor-hub extension is a separate component from the rotor hub.

9. The wind turbine of claim 1 wherein the conical rotor-hub extension is disposed immovably on the rotor hub, in either a form-fitting manner or a form- and force-fitting manner.

10. The wind turbine of claim 1 comprising a pitch drive configured as part of the conical rotor-hub extension or disposed within the conical rotor-hub extension.

11. The wind turbine of claim 1 wherein the conical rotor-hub extension comprises a first hub-extension component and a second hub-extension component, wherein the first and second hub-extension components are configured parallel to a main axis of rotation of the blade bearing as half-shells of the conical rotor-hub extension.

12. The wind turbine of claim 11 wherein the first and second hub-extension components of the conical rotor-hub extension comprise ribs.

13. The wind turbine of claim 1 wherein the blade bearing comprises a first blade-bearing ring and a second blade-bearing ring, wherein the first blade-bearing ring is connected to the conical rotor-hub extension in a form-fitting manner, in a form- and force-fitting manner, or in a form configured as part of the conical rotor-hub extension, the wind turbine comprising a nose disposed on the first or second blade-bearing ring.

14. The wind turbine of claim 1 wherein the conical rotor-hub extension is a cast component.

15. A method of operating the wind turbine of claim 1, the method comprising:
   moving the rotor blade relative to the rotor hub and the conical rotor-hub extension; and
   maintaining the rotor hub and the conical rotor-hub extension in a fixed state relative to one another.

16. A rotor system for a wind turbine comprising:
   a rotor hub;
   a blade bearing;
   a rotor blade connected to the blade bearing directly or indirectly; and
   a conical rotor-hub extension disposed between the rotor hub and the blade bearing, wherein the conical rotor-hub extension has a first diameter on a first side directed toward the blade bearing and a second diameter on a second side directed toward the rotor hub, wherein the first diameter is greater than the second diameter,
   wherein a surface of the conical rotor-hub extension that is oblique to a main axis of rotation of the blade bearing includes a through-passage opening for through-passage of at least one of a tool or a fastening element for fastening the rotor blade on the blade bearing, wherein the through-passage opening extends parallel to the main axis of rotation of the blade bearing, wherein the through-passage opening extends parallel to a fastening opening in the blade bearing for fastening the rotor blade to the blade bearing, with center lines of the through-passage opening and the fastening opening being aligned.

* * * * *